March 2, 1971   F. D. VOSS   3,567,183
PNEUMATIC JACK
Filed June 20, 1968

FRANCIS D. VOSS
INVENTOR.

BY
HIS ATT'Y though a guide 16 mounted on the upper wall of the cylinder. The inner surface of the guide is formed either with an axial cross section of arcuate form, or at least with the walls tapered both way from the center in an axial direction. This allows a slight amount of misalignment and avoids the problem of having the edges of the guide digging into the surface of the piston rod. An O-ring 17 may also be provided for this guide.

3,567,183
PNEUMATIC JACK
Francis D. Voss, P.O. Box 212,
Emerson, Nebr. 68733
Filed June 20, 1968, Ser. No. 738,598
Int. Cl. B66f 3/24; F16c 1/26; F16j 15/18
U.S. Cl. 254—93          2 Claims

ABSTRACT OF THE DISCLOSURE

A pneumatic jack having a piston of the general shape of a central segment of a sphere. The piston rod extends through a guide which is formed with internal surfaces having an arcuate or tapered axial cross section. Adjustment of the length of the piston rod is accomplished by a telescoping device which includes a transverse pin extending through one part of the piston rod and setting in a notch in the other part, thus aligning the two parts for insertion of a second pin.

---

This invention pertains to jacks and more particularly to a pneumatic jack having a piston and a piston rod guide formed to allow minor misalignment and having unique adjustment means on the piston rod.

Jacks for the use in raising heavy equipment, particularly truck tractors and semi-trailers are usually either hydraulic or pneumatic. Hydraulic jacks are usually very heavy and therefore hard to work with. Pneumatic jacks can be built considerably lighter, but the lighter construction sometimes leads to problems.

One of these problems is the possibility of slight misalignment of the piston in the cylinder. This is common, especially with thinner pistons. Therefore, I have proposed a shaped piston as described in my co-pending application, Ser. No. 640,770 filed Apr. 27, 1967. However, this has not solved the problem of misalignment of the piston rod in the guides.

Another problem is the range of lengths needed to make the jacks useful in all applications. For instance, the jacks may be used on the front end of a truck tractor where the jacking points are relatively close to the ground or on the rear of a semi-trailer where the frame is relatively high. Therefore either a long stroke or an adjustable piston rod is necessary. By my invention, I provide an easily adjustable piston rod having unique features.

Figure 1:
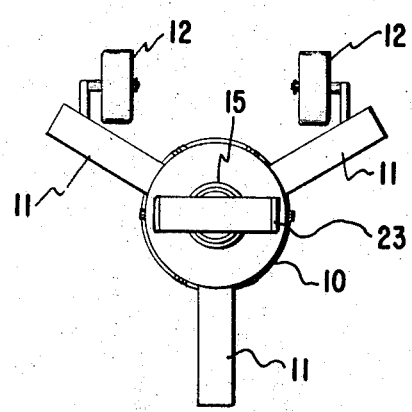
Figure 2:
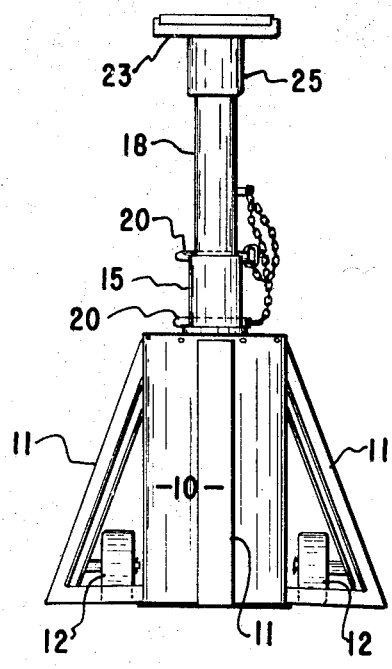
Figure 3:
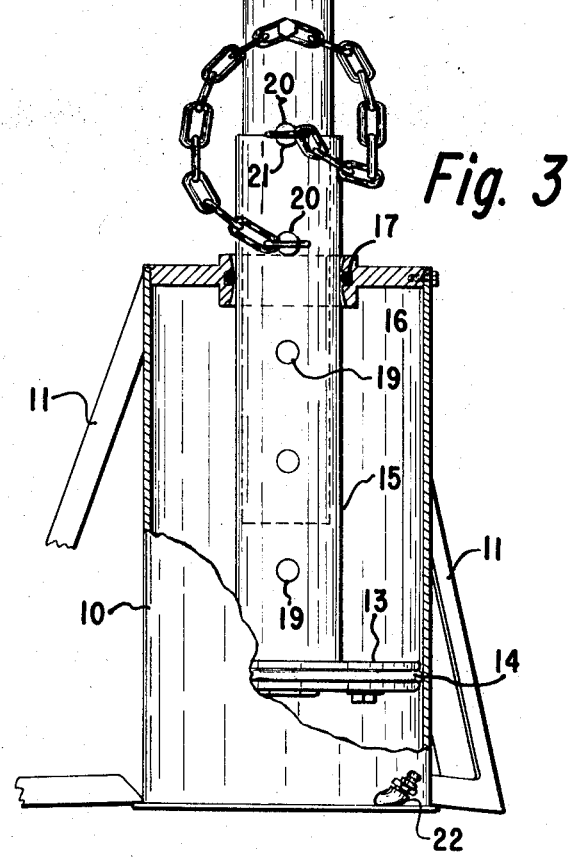

A more complete understanding of my invention in its embodiment may be had from study of the following specification and the drawings in which:

FIG. 1 is a top plan view of the jack of my invention,
FIG. 2 is an elevational view of the jack, and
FIG. 3 is an elevational view of the device to an enlarged scale with part of the cylinder broken away to show interior parts.

Briefly, my invention comprises a jack having a piston in a cylinder, a piston rod extending from the piston through a guide on the cylinder. The guide is uniquely formed to allow slight misalignment without binding. The rod is formed of two telescoping parts which are held in adjusted relation by pins. A unique method of aligning the two parts is provided.

More specifically, the jack of my invention comprises a cylinder 10, to which are fastened legs 11 in the form of a tripod to support the cylinder on a fixed surface. Wheels 12 may be provided on two of the legs to provide for mobility of the jack as is common in the art.

Within the cylinder 10 is a piston 13 which is preferably formed with rounded edges as is more fully described in my co-pending application specified above. This piston may also include an O-ring 14 for better sealing between it and the inner cylinder wall.

A tubular piston rod 15 extends upward from the piston and extends through a guide 16 mounted on the upper wall of the cylinder. The inner surface of the guide is formed either with an axial cross section of arcuate form, or at least with the walls tapered both way from the center in an axial direction. This allows a slight amount of misalignment and avoids the problem of having the edges of the guide digging into the surface of the piston rod. An O-ring 17 may also be provided for this guide.

A post 18 is slidably disposed within the tubular member 15. Both the post and the tube are provided with a series of openings 19 adapted to register between the two so that pins 20 may be inserted to hold the telescoping members in adjusted relationship. The openings are equally spaced so that one pair is in register, all others within the double thickness will also be. In order to provide proper alignment, I space the openings so that nearly one half of such an opening will have to be made in the top of the tubular member 15, thus forming a notch 21.

By placing a pin 20 through the topmost opening 19 to be used in the post 18, and then sliding this post downward and turning it until the pin falls into the notch 21, one is assured that all other openings 19 are then in alignment. The piston can then be forced upward by injecting air under pressure through the valve 22 in the cylinder. When the device is raised to somewhat above proper height, a second pin may be inserted through the registered openings, and the piston allowed to settle somewhat until the pin 20 rests on the edges of the guide 16 thus forming a positive holding mechanism to support the device being jacked.

A top pad 23 may be mounted on a tang 24 of a diameter equal to that of the post 18. A socket 25 on the top of the post will receive this tang. Thus, if necessary, a second section of post may be inserted into the socket to provide additional extension of the post.

Having thus described my invention in its embodiment, I am aware that numerous and extensive departures may be made therefrom without departing from the spirit and scope of the invention as limited only by the following claims.

I claim:
1. A jack comprising a cylinder, a piston disposed in said cylinder, piston rod means on said piston extending outwardly of said cylinder and adapted to engage the device to be jacked, said cylinder having a top wall formed to provide a guide through which said piston rod means extends, said guide having inner walls engageable with said piston rod means, said walls being formed with a cross section of arcuate convex form whereby said rod means can be tilted and still run smoothly through said guide.

2. The device of claim 1 in which said piston is in the shape of a central segment of a sphere.

References Cited

UNITED STATES PATENTS

| | | | |
|---|---|---|---|
| 2,360,735 | 10/1944 | Smith | 92—168X |
| 2,961,837 | 11/1960 | Suderow | 254—93X |
| 3,250,503 | 5/1966 | Karstens | 248—354H |

ROBERT C. RIORDON, Primary Examiner

D. R. MELTON, Assistant Examiner

U.S. Cl. X.R.

92—165; 308—4